US009460095B2

(12) United States Patent
Ayers et al.

(10) Patent No.: US 9,460,095 B2
(45) Date of Patent: Oct. 4, 2016

(54) QUICK CAPTURE OF TO-DO ITEMS

(75) Inventors: Justin Ayers, Maple Valley, WA (US); Gregory Howard, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 13/305,713

(22) Filed: Nov. 28, 2011

(65) Prior Publication Data

US 2013/0138622 A1 May 30, 2013

(51) Int. Cl.
*G06F 17/30* (2006.01)
*G06Q 10/10* (2012.01)

(52) U.S. Cl.
CPC ... *G06F 17/30058* (2013.01); *G06F 17/30017* (2013.01); *G06Q 10/10* (2013.01)

(58) Field of Classification Search
CPC . G06Q 10/109; G06F 9/54; G06F 17/30265; G06F 17/30268; G06F 17/30017
USPC .................................................. 707/755, 621
See application file for complete search history.

(56) References Cited

U.S. PATENT DOCUMENTS

| | | | |
|---|---|---|---|
| 6,680,675 B1 | 1/2004 | Suzuki | |
| 7,949,529 B2 | 5/2011 | Weider | |
| 2006/0074844 A1* | 4/2006 | Frankel et al. | 707/1 |
| 2006/0208861 A1* | 9/2006 | Stroupe et al. | 340/309.7 |
| 2007/0106931 A1* | 5/2007 | Vartiainen et al. | 715/512 |
| 2010/0159978 A1 | 6/2010 | Sierawski | |
| 2010/0332280 A1 | 12/2010 | Bradley | |
| 2011/0112881 A1 | 5/2011 | Malhotra | |
| 2011/0126123 A1 | 5/2011 | Reter | |
| 2011/0145823 A1* | 6/2011 | Rowe et al. | 718/100 |

OTHER PUBLICATIONS

Mahure, Miss Minal S. "Place Reminder—An Android APP." (2015).*
Dutta, Divya, et al. "Event Scheduler and Reminder in Android." (2012).*
Gil, Yolanda, et al. "Capturing Common Knowledge about Tasks: Intelligent Assistance for To-Do Lists." ACM Transactions on Interactive Intelligent Systems (TiiS) 2.3 (2012): 15.*
"How to Capture Your Life" Apr. 21, 2008, http://thecorporatehack.blogspot.com/2008/04/how-to-capture-your-life.html, 3 pages.
"Five Best Mobile To-Do List Managers" Retrieved Date: Jul. 15, 2011, http://lifehacker.com/5630230/five-best-mobile-to+do-list-managers, 3 pages.

* cited by examiner

*Primary Examiner* — Nan Hutton
(74) *Attorney, Agent, or Firm* — Judy Yee; Micky Minhas

(57) ABSTRACT

Systems, methods and computer program products for facilitating the quick capture and management of task list (i.e., "to-do") items are disclosed. Such systems, methods and computer program products allow a user of a computing device to access a persistently and ubiquitously executing stand-alone application that facilitates a capture solution that supports multiple input modalities—voice, image, video, handwriting and text. This allows the quick capture and creation of to-do's anytime and anywhere. Once captured, the device may use a combination of natural language processing with the power of an internet search engine to identify, organize, and surface relevant content and context for a user as a reminder of such captured to-do's.

20 Claims, 5 Drawing Sheets

QUICK CAPTURE OF TO-DO ITEMS

FIELD OF THE INVENTION

The present invention generally relates to computer application programs that increase user productivity and more particularly to systems, methods and computer program products for facilitating the capture and management of task lists.

BACKGROUND

In today's fast-pace world and technological environment, it is common for people to utilize their mobile telephones, laptops, tablet computers, personal digital assistants (PDAs) and the like as their ("virtual") personal assistants. And, to keep up with their fast-paced lives, such people often employ calendar, notes and a variety of available productivity application (software) programs to create and manage an ever-expanding list of tasks and reminders (i.e., creating and managing bulleted lists of "to-do" items or simply, "to-do's").

Yet, despite the use of computer-based application programs, it is often difficult to input to-do's into mobile telephones, laptops, tablet computers, and PDAs, which creates a barrier to adopting and sticking with any one organizational system. This is because people are not always physically near their mobile telephones, laptops, tablet computers and PDAs. This is also because typing on such devices (and their associated smaller or abbreviated keyboards) is slow, and having to enter information into multiple (and often not applicable), predetermined fields or navigate complicated digital user interfaces is even slower. Thus, because no existing system provides both ubiquity and ease of entry, people often resort to using paper (e.g., a notepad or "sticky" notes).

The irony of the above-described situation is that, despite our fast-paced, technologically-advanced world, people often resort to using an elaborate nest of color-coded sticky notes with handwritten to-do's. This is simply a result of existing applications and systems executing on mobile telephones, laptops, tablet computers, and PDAs not allowing users to easily create (and retrieve) to-do's. That is, users employing such systems must often switch between such productivity applications and their contact, calendars, email, SMS, voice, camera and text applications.

Given the foregoing, what are needed are systems, methods and computer program products for facilitating the quick capture and management of task lists (i.e., "to-do's").

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing systems, methods and computer program products for facilitating the quick capture and management of task lists (i.e., "to-do's").

In an embodiment, the present invention provides systems, methods and computer program products that lower the barrier to adoption by providing a simple way for people to enter new to-do's as they occur to them—anywhere and anytime. That is, the present invention provides an application executing on a mobile telephone, laptop, tablet computer, PDA or like computing device that is ubiquitous and as easy to get to as a pad of sticky notes. In such an embodiment, the user simply has to input "one click" to quickly capture a new task using text, voice or the computing device's camera. Such an embodiment integrates into how people work today by making it trivial to convert content from e-mail, documents, and the web into to-do items.

In other embodiments, not all quickly-captured new tasks require input in the form of text, voice, or a photo. That is, in such embodiments, a new to-do may be created simply by the user launching an application, or by the user "flagging" preexisting content as a to-do to enable them to track and remind themselves of the item more effectively (as part of a holistic life management solution). For example, the user may flag a missed call, a text or a chat message for follow-up as a new to-do.

In yet another embodiment, the systems, methods and computer program products of the present invention allow the computing device user to add additional to-dos, even at the sub level, in a manner that feels like typing a bulleted list. In such an embodiment, the user may optionally mark any to-do item with rough times and places to be filtered later.

In yet another embodiment, the systems, methods and computer program products of the present invention employ natural language processing along with knowledge gleaned from aggregated to-do's (stored on the computing device or in the cloud) to automate organization of such to-do's.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

The present invention is directed to systems, methods and computer program products for facilitating the quick capture and management of task lists (i.e., "to-do's"). In various embodiments, the present invention provides systems, methods and computer program products to allow a computer user to organize and simplify their everyday life by allowing the quick and easy capture and management of to-do's. That is, it allows the user to answer that all-too-familiar question: "How do I remember the little stuff?" In such various embodiments, the input of such to-do's is streamlined and the output—the reminders—surfaces only when and how it is meaningful to the user in a seamless, cross-device and cross-application manner.

Figure 1:
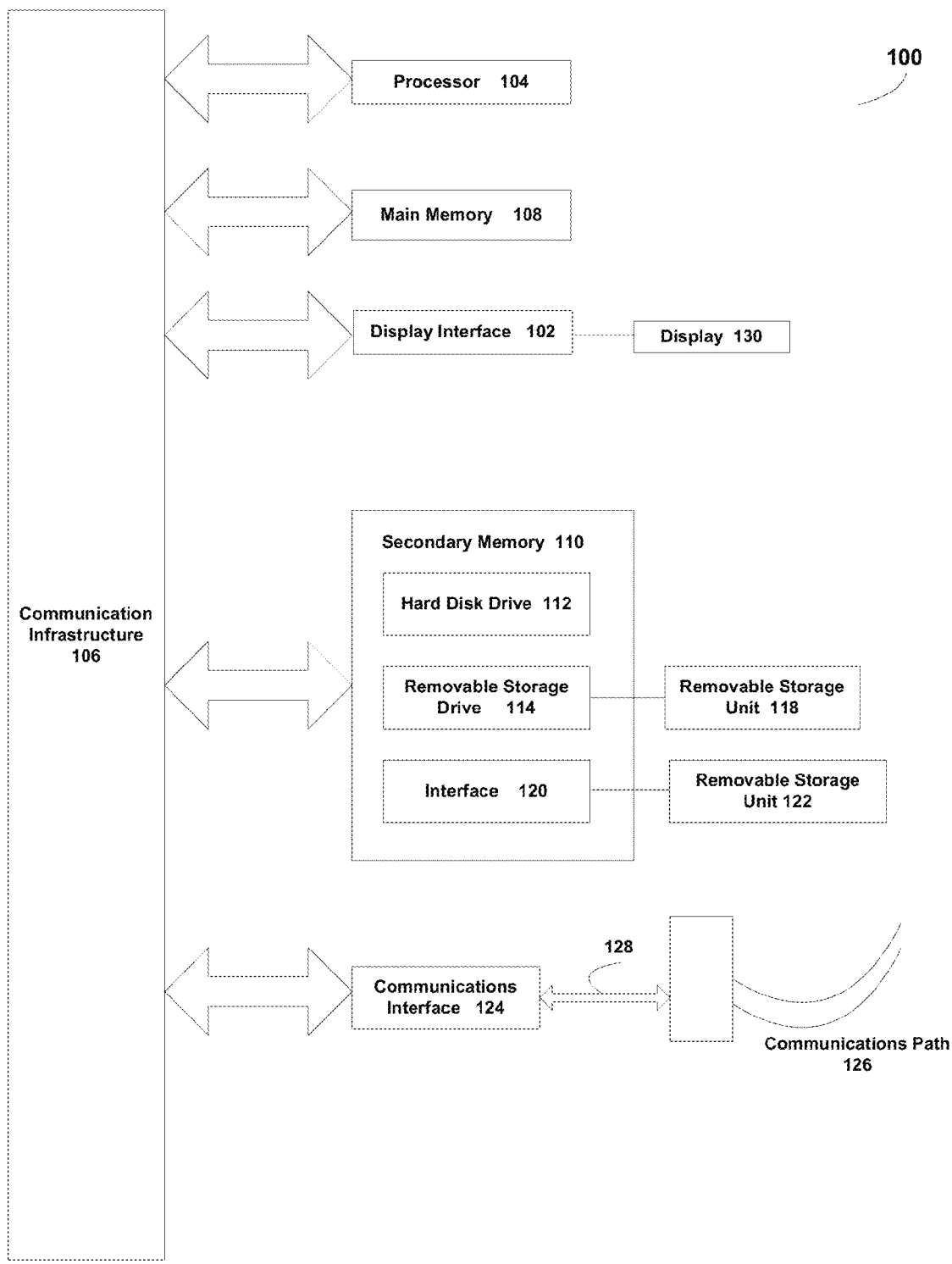
FIG. 1 is a block diagram of an exemplary computer system useful for implementing the present invention.

In one embodiment, the invention is directed toward one or more computer systems capable of carrying out the functionality described herein. An example of a computer system 100 is shown in FIG. 1.

Computer system 100 includes one or more processors, such as processor 104. The processor 104 is connected to a communication infrastructure 106 (e.g., a communications bus or network). Various software aspects are described in terms of this exemplary computer system. After reading this description, it will become apparent to a person skilled in the relevant art(s) how to implement the invention using other computer systems and/or architectures.

Computer system 100 can include a display interface 102 that forwards graphics, text and other data from the communication infrastructure 106 (or from a frame buffer not shown) for display on the display unit 130.

Computer system 100 also includes a main memory 108, preferably random access memory (RAM) and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well known manner. Removable storage unit 118 represents a floppy disk, magnetic tape, optical disk, etc. which is read by and written to by removable storage drive 114. As will be appreciated, the removable storage unit 118 includes a computer usable storage medium having stored therein computer software and/or data.

In alternative aspects, secondary memory 110 may include other similar devices for allowing computer programs or other code or instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of non-transitory signals 128 which may be electronic, electromagnetic, optical or other signals capable of being received by communications interface 124. These signals 128 are provided to communications interface 124 via a communications path (e.g., channel) 126. This channel 126 carries signals 128 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 114, a hard disk installed in hard disk drive 112 and signals 128. These computer program products provide software to computer system 100. The invention is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features of the present invention, as discussed herein. In particular, the computer programs, when executed, enable the processor 104 to perform the features of the present invention. Accordingly, such computer programs represent controllers of the computer system 100.

In an embodiment where the invention is implemented using software, the software may be stored in a computer program product and loaded into computer system 100 using removable storage drive 114, hard drive 112, communications interface 124 or some form of solid state or flash memory. The control logic (software), when executed by the processor 104, causes the processor 104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

As will be apparent to one skilled in the relevant art(s) after reading the description herein, the computer architecture shown in FIG. 1 may be configured as a desktop, a laptop, a server, a tablet computer, a PDA, a mobile computer, a smart telephone, a mobile telephone, an intelligent communications device or the like.

In yet another embodiment, the invention is implemented using a combination of both hardware and software.

Figure 2:
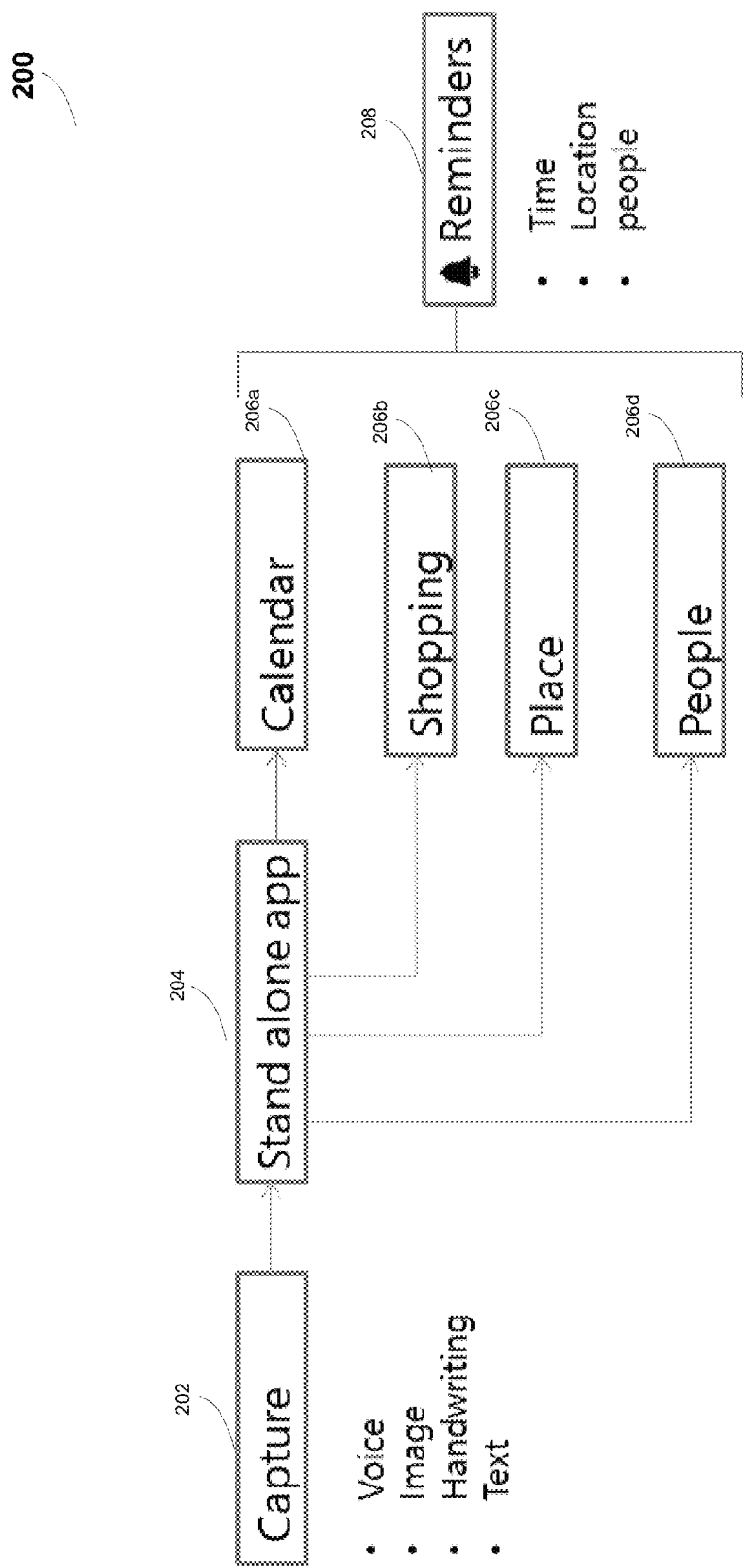
FIG. 2 is a dataflow diagram illustrating an exemplary quick capture and management of task lists process according to an embodiment of the present invention.

Referring to FIG. 2, a dataflow diagram 200 illustrating an exemplary illustrating an exemplary quick capture and management of task lists (i.e., "to-do's") process, according to an embodiment of the present invention, is shown. (As will be appreciated by those skilled in the relevant art(s) after reading the description herein, the dataflow and associated process steps of diagram 200 would execute on computer system 100.)

In such an embodiment, the quick capture dataflow 200 is facilitated by a persistently and ubiquitously present (stand alone) application 204 executing on device 100 that facilitates an automatic or user-initiated one-click solution to capture (step 202) to-do's across the device in a consistent way. That is, quick capture dataflow 200 results in a common, integrated experience on device 100 that lets a user take a "snapshot" of any moment. In such an embodiment, input modality of a to-do item goes beyond handwriting and text and extends to voice, photo images and video as a means of input (via any other native or non-native application 206 installed and executing on device 100). This makes it easy to create a to-do anytime and anywhere.

As will be appreciated by those skilled in the relevant art(s) after reading the description herein, in an embodiment where device 100 is a mobile telephone, application 204 may provide for capturing a to-do (step 202) outside the lock screen for quick access (voice note, picture, location, person, etc.) by receiving an input from the user within an application 206 indicative of: flagging an item supported in any email account; flagging an item supported in any browser environment (i.e., capturing a webpage URL or just a portion of a webpage); flagging an IM/SMS conversation; flagging a person from a contact list or people-based experience applications 206; flagging a picture or video from the device; and flagging an item from any third-party, non-native application API executing on the mobile telephone device 100.

As used herein, "outside the lock screen" means circumventing the locking mechanism of computing device 100 that normally prevents access (e.g., without the input of a preselected password or predefined key sequence) for the purpose of inputting data into the system, thus preserving the security of the user's existing data, but permitting efficient addition of new data.

In an embodiment, once captured, application 204 may simply store the captured to-do. Application 204 may, however, allow the user of device 100 to add metadata—time, location, due date, sharing, etc.—for later, "smarter" presentation to the user (i.e., a reminder 208 of a previously-captured to-do). In another embodiment, once captured, device 100 may use a combination of natural language processing with the power of an internet search engine (e.g., the Bing® web search engine available from Microsoft Corporation of Redmond, Wash.) to identify, organize, and surface relevant content and context for a user. That is, captured to-do items can engage with an internet search engine to identify context and content—visual recognition, text searching, voice-to-text translation and data mining—to enrich the content and context of the captured to-do for later, "smarter" presentation to the user (i.e., a reminder 208 of the to-do). That is, in an embodiment, an internet search engine may be utilized, using information contained in a captured to-do item as a search term, to augment any metadata associated with the captured to-do item.

In various embodiments, application 204 interacts with other applications 206 executing on device 100 to surface (as a reminder 208 of captured to-do's) relevant content and context to the user. For example, application 204 may surface relevant content and context to the user via a calendar application 206a (i.e., reminder 208 is simply a calendar item to-do), a shopping application 206b (i.e., reminder 208 is a product search related to a captured image of a user-desired product), a map/location application 206c (i.e., reminder 208 is marker to remind the user about something relevant to a tagged location), a people/contacts application 206d (i.e., reminder 208 is fact the user is reminded of next time they call, SMS or IM a specific person in their contact list) and the like.

Referring to FIGS. 3A-G, screenshots 300-360 illustrating an exemplary GUI schema for the quick capture and management of task lists (i.e., "to-do's"), according to an embodiment of the present invention, are shown.

In an embodiment, device 100 is a mobile telephone and application 204 provides for capturing a to-do (step 202) by receiving an input from the user within an application 206 indicative of flagging an item. For example, the user may press a designated key on device 100 indicative of flagging an item which results in screen 300 being displayed. Screen 300 may allow the user to select (via, for example, tapping) the input modality for quickly capturing a to-do (e.g., text, photo image or voice). In an alternate embodiment, a new to-do may be created simply by the user "flagging" preexisting content stored on device 100 as a to-do (i.e., without the need to enter new text, take a new picture or record a new voice note) to enable them to track and remind themselves of the item more effectively.

In an embodiment, application 204 would display screen 310 on device 100 when the user selects, for example, the picture input modality for capturing a to-do, and uses the built-in camera on device 100 to take a picture of a box of fabric that was previously in storage but is now sitting by her front door. The user has utilized application 204 to create a to-do so that she can one day deliver the box to her mother's house the next time she is free.

In an embodiment, application 204 would display screen 320 on device 100 after the user has utilized the built-in camera on device 100 to take a picture of the box of fabric. Screen 320 indicates to the user that the to-do has been quickly captured and gives the user the option to add metadata (e.g., time, location, due date, sharing, etc.) in order to later receive a "smarter" reminder 208 of the quickly-captured to-do item. Should the user tap the indicated area of screen 320, application 204 would then display screen 330 on device 100 to allow entry of such metadata.

In an embodiment, application 204 would display screen 330 on device 100 after the user has entered metadata about the to-do, and is presented with the option to associate (or "pin") the captured to-do to a particular application 206 that will eventually present the reminder 208 to the user. Should the user decide to pin the reminder to an application 206, screen 340 is then displayed with the choice of applications 206 (e.g., a people/contacts application 206d, map/location application 206c, a calendar application 206a, a third-party, non-native application 206 installed on device 100 or simply the "home screen" or "desktop" provided by the operating system of device 100).

Figure 3B:
FIGS. 3A-G are screenshots illustrating exemplary graphical user interface (GUI) windows for the quick capture and management of task lists according to various embodiments of the present invention.
Figure 3A:
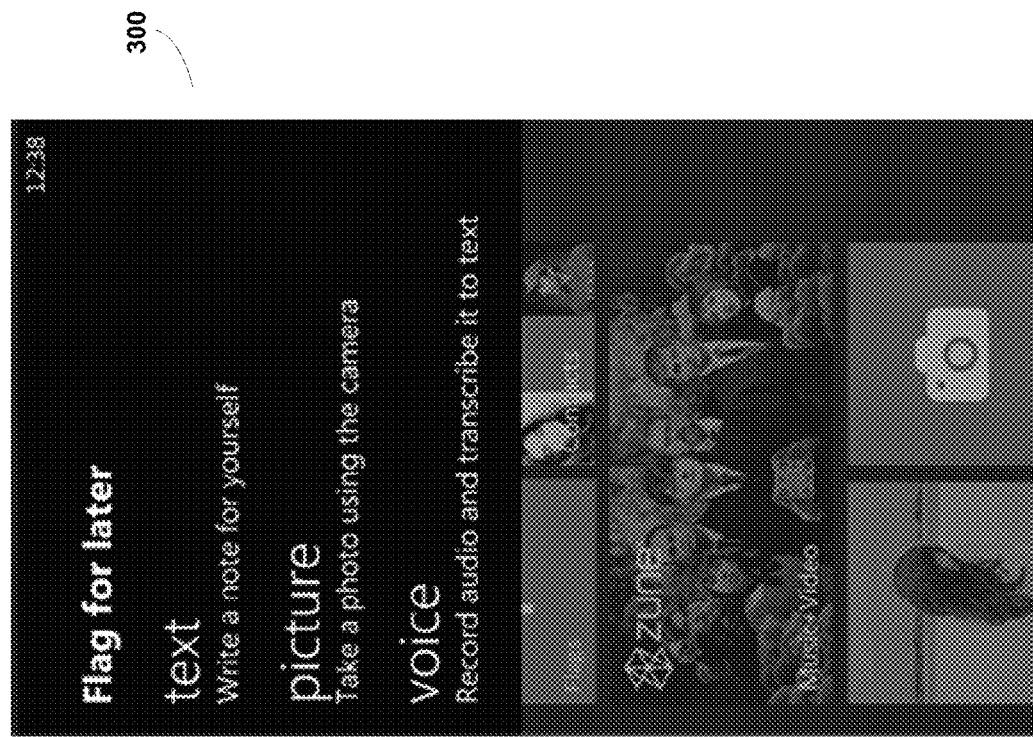
Figure 3E:
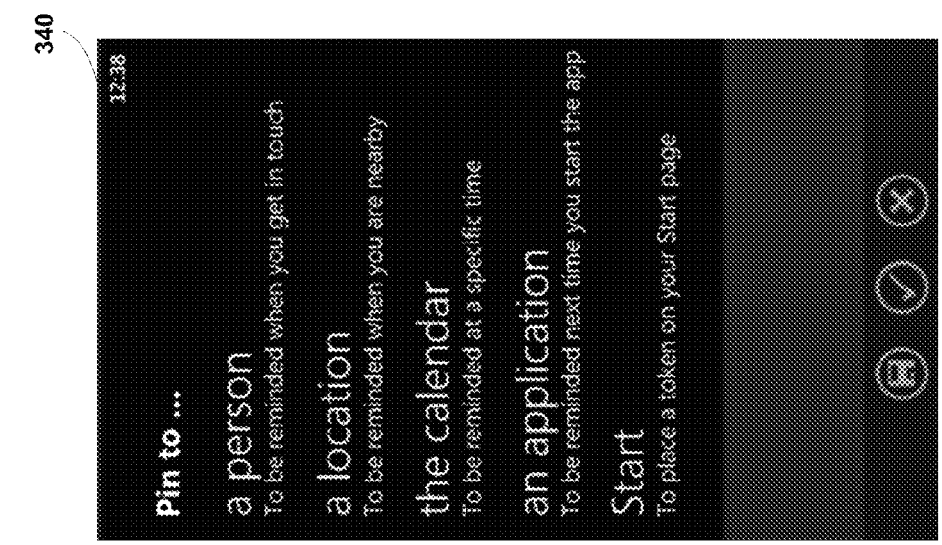
Figure 3D:
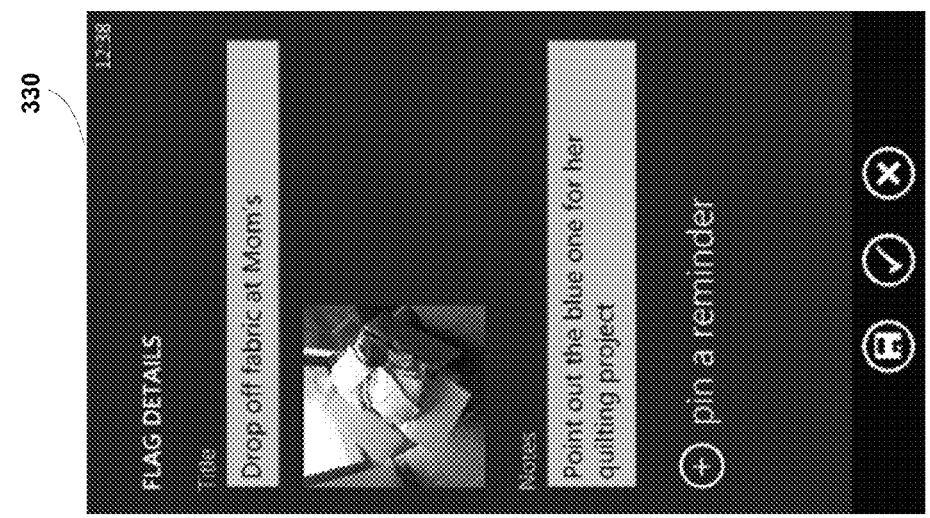
Figure 3C:
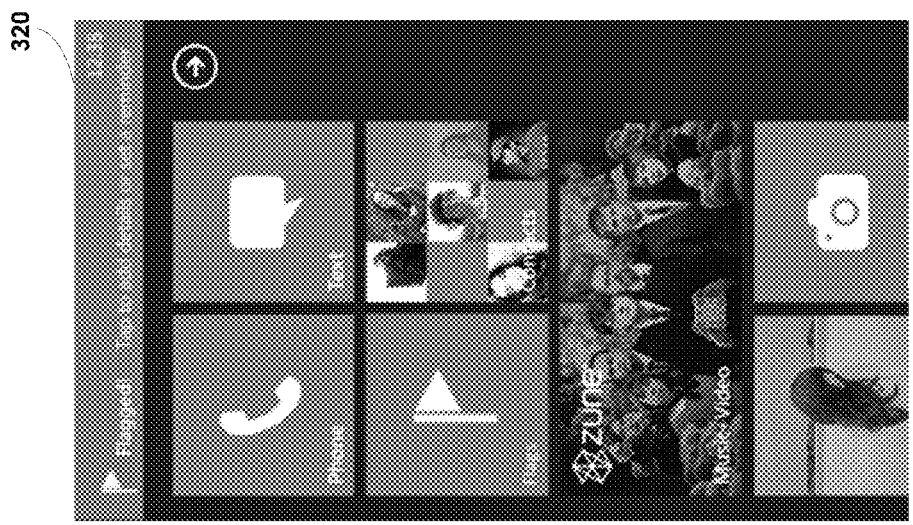
Figure 3G:
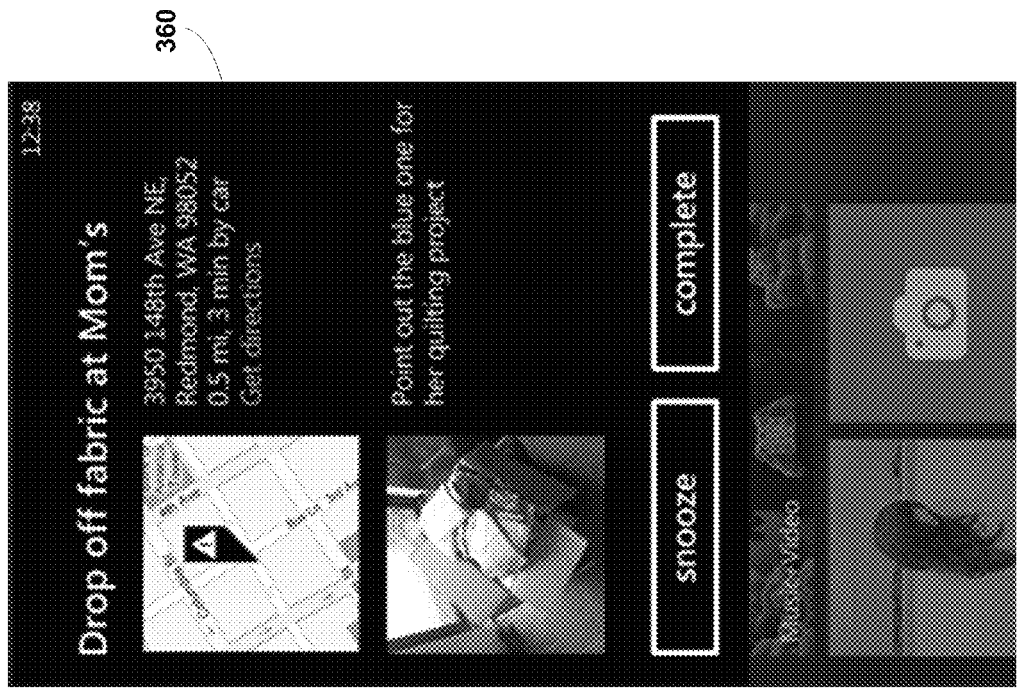
Figure 3F:
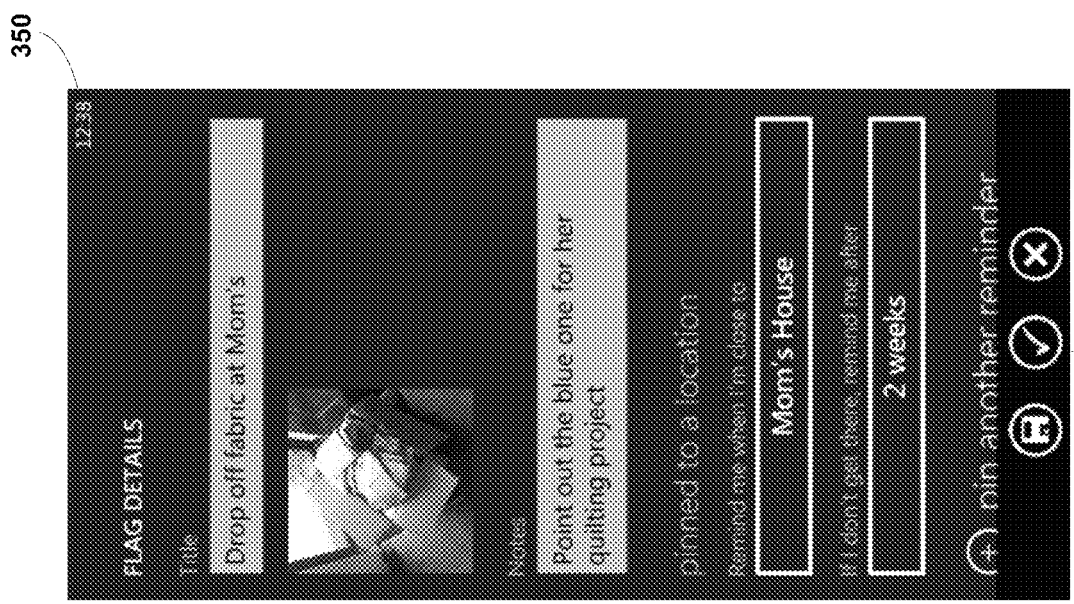

In an embodiment, application 204 would display screen 350 on device 100 after the user has chosen, for example, to pin the reminder to a map/location application 206c. Such a screen, as shown in FIG. 3F, may then allow the user to input a specific location the captured to-do should be associated with and a specific time period in which to remind the user of the to-do. The to-do is now attached to the map/location application 206c and saved in the memory of device 100.

Now, as the user drives near her mother's house, possibly on an unrelated errand, her mobile telephone device 100 presents her with a reminder 208, as shown in screen 360, by informing her that it may now be a good time to drop off that box of fabric. This presentation of reminder 208 is context-relevant given that map/location application 206c, to which the to-do item was pinned, detects the user is located near her mother's home. This presentation of reminder 208 is also content-relevant as it displays associated metadata previously entered using display screen 330 on device 100. The user would then have the option of selecting a "snooze" option, thus saving the to-do task item for a future trip, or she may have the time now to take care of the to-do item and marks the to-do item flag "complete."

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A method for facilitating the quick capture and management of to-do items by an application persistent on a computing device, the method executing on at least one processor of the computing device, the method comprising the steps of:
   (a) receiving a first input from a user of the computing device to flag an item outside of the application, said first input indicative of a desire by said user to capture a to-do item for the flagged item;
   (b) receiving a second input from said user, said second input indicative of a desired input modality by said user to capture an additional input corresponding to said to-do item, the second input being distinct and separate from the first input and the additional input, wherein said desired input modality is one of: text, voice, photo image, video, and flagging preexisting content stored on the computing device;
   (c) capturing the additional input corresponding to said to-do item, via said desired input modality in response to said second input, and storing said to-do item in a memory accessible to the computing device, the additional input being distinct and separate from the first input and the second input;
   (d) associating said captured to-do item with a second application installed on the computing device for utilization by the user to complete the to-do item; and
   (e) presenting a reminder to said user, utilizing at least said second application installed on the computing device, wherein said reminder is presented to said user in a context-relevant manner.

2. The method of claim 1, wherein the computing device is one of: a desktop; a laptop; a server; a tablet computer; a PDA; a mobile computer; a smart telephone; a mobile telephone; and an intelligent communications device.

3. The method of claim 1, wherein said second application installed on the computing device is one of: a calendar application; a map application; a shopping application; a contact application; and an operating system.

4. The method of claim 1, wherein said memory is one of: a memory located on the computing device; and a cloud storage memory.

5. The method of claim 1, further comprising the step of:
   (f) receiving a third input from said user, said third input indicative of metadata to be associated with said captured to-do item and comprises at least one of: a due date; a location; and a time;
   wherein said reminder includes at least a portion of said associated metadata.

6. The method of claim 5, further comprising the steps of:
   (g) utilizing an internet search engine, using information contained in said captured to-do item as a search term, to augment said associated metadata; and
   (h) storing said to-do item and said augmented associated metadata in said memory accessible to the computing device.

7. The method of claim 5, further comprising the steps of:
   (g) accessing said memory accessible to the computing device to retrieve a plurality of previously-captured to-do items; and
   (h) utilizing at least a portion of the information contained in said plurality of previously-captured to-do items to augment said associated metadata.

8. A computer program product comprising a computer usable storage medium device encoded in a computer having control logic stored therein for causing an application persistent on the computer to facilitate the quick capture and management of to-do items, said control logic comprising:
   first computer readable program code means for causing the computer to receive a first input from a user to flag an item outside of the application, said first input indicative of a desire by said user to capture a to-do item for the flagged item;
   second computer readable program code means for causing the computer to receive a second input from said user, said second input indicative of a desired input modality by said user to capture an additional input corresponding to said to-do item, the second input being distinct and separate from the first input and the additional input, wherein said desired input modality is one of: text, voice, photo image, video, and flagging preexisting content stored on the computing device;
   third computer readable program code means for causing the computer to capture the additional input corresponding to said to-do item, via said desired input modality in response to said second input, and storing said to-do item in a memory accessible to the computer, the additional input being distinct and separate from the first input and the second input;
   fourth computer readable program code means for causing the computer to associate said captured to-do item with a second application installed on the computer for utilization by the user to complete the to-do item; and
   fifth computer readable program code means for causing the computer to present a reminder to said user, utilizing at least said second application installed on the computer, wherein said reminder is presented to said user in a context-relevant manner.

9. The computer program product of claim 8, wherein the computer is one of: a desktop; a laptop; a server; a tablet computer; a PDA; a mobile computer; a smart telephone; a mobile telephone; and an intelligent communications device.

10. The computer program product of claim 8, wherein said second application installed on the computer is one of: a calendar application; a map application; a shopping application; a contact application; and an operating system.

11. The computer program product of claim 8, wherein said memory is one of: a memory located on the computer; and a cloud storage memory.

12. The computer program product of claim 8, further comprising:
    sixth computer readable program code means for causing the computer to receive a third input from said user, said third input indicative of metadata to be associated with said captured to-do item and comprises at least one of: a due date; a location; and a time;
    wherein said reminder includes at least a portion of said associated metadata.

13. The computer program product of claim 12, further comprising:
    seventh computer readable program code means for causing the computer to utilize an internet search engine, using information contained in said captured to-do item as a search term, to augment said associated metadata; and eighth computer readable program code means for causing the computer to store said to-do item and said augmented associated metadata in said memory accessible to the computer.

14. The computer program product of claim 12, further comprising:
seventh computer readable program code means for causing the computer to access said memory accessible to the computer to retrieve a plurality of previously-captured to-do items; and
eighth computer readable program code means for causing the computer to utilize at least a portion of the information contained in said plurality of previously-captured to-do items to augment said associated metadata.

15. A computer system for facilitating the quick capture and management of to-do items by an application persistent on the computer system, comprising:
(a) means for receiving a first input from a user of the computer system to flag an item outside of the application, said first input indicative of a desire by said user to capture a to-do item for the flagged item;
(b) means for receiving a second input from said user, said second input indicative of a desired input modality by said user to capture an additional input corresponding to said to-do item, the second input being distinct and separate from the first input and the additional input, wherein said desired input modality is one of: text, voice, photo image, video, and flagging preexisting content stored on the computing device;
(c) means for capturing the additional input corresponding to said to-do item, via said desired input modality in response to said second input, and storing said to-do item in a memory accessible to the computer system, the additional input being distinct and separate from the first input and the second input;
(d) means for associating said captured to-do item with a second application installed on the computer system for utilization by the user to complete the to-do item; and
(e) means for presenting a reminder to said user, utilizing at least said second application installed on the computer system, wherein said reminder is presented to said user in a context-relevant manner.

16. The computer system of claim 15, wherein the computer system is one of: a desktop; a laptop; a server; a tablet computer; a PDA; a mobile computer; a smart telephone; a mobile telephone; and an intelligent communications device.

17. The computer system of claim 15, wherein said second application installed on the computer system is one of: a calendar application; a map application; a shopping application; a contact application; and an operating system.

18. The computer system of claim 15, wherein said memory is one of: a memory located on the computer system; and a cloud storage memory.

19. The computer system of claim 15, further comprising:
(f) means for receiving a third input from said user, said third input indicative of metadata to be associated with said captured to-do item and comprises at least one of: a due date; a location; and a time;
wherein said reminder includes at least a portion of said associated metadata.

20. The computer system of claim 19, further comprising the steps of:
(g) means for utilizing an internet search engine, using information contained in said captured to-do item, to augment said associated metadata; and
(h) means for storing said to-do item and said augmented associated metadata in said memory accessible to the computer system.

* * * * *